Aug. 28, 1962 R. P. LAMBECK 3,051,092
PUMP TORQUE LIMITING MEANS
Filed Jan. 6, 1959 2 Sheets-Sheet 1
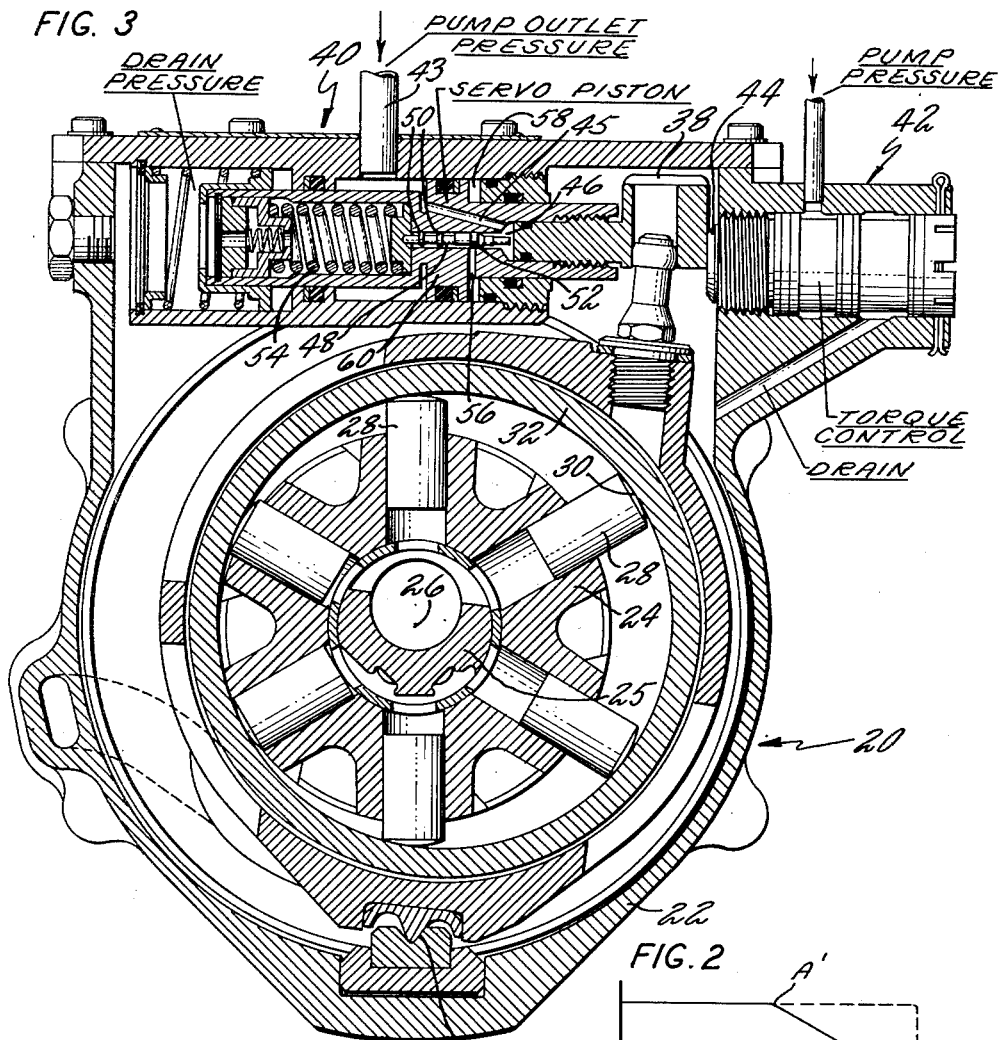
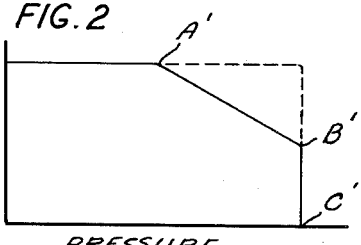
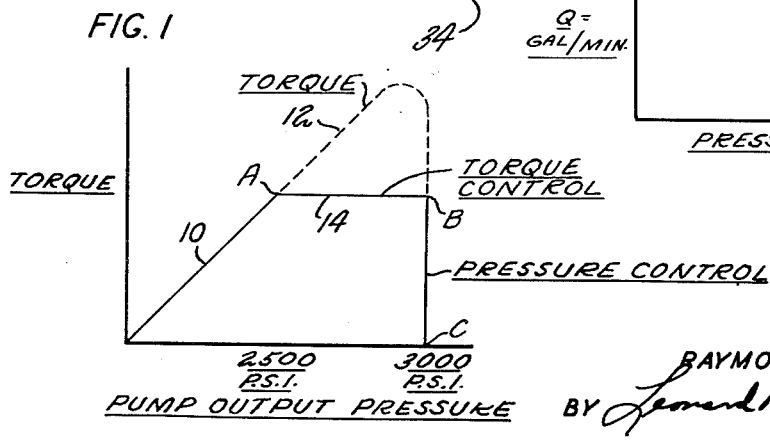
INVENTOR
RAYMOND P. LAMBECK
BY Leonard F. Wakland
ATTORNEY

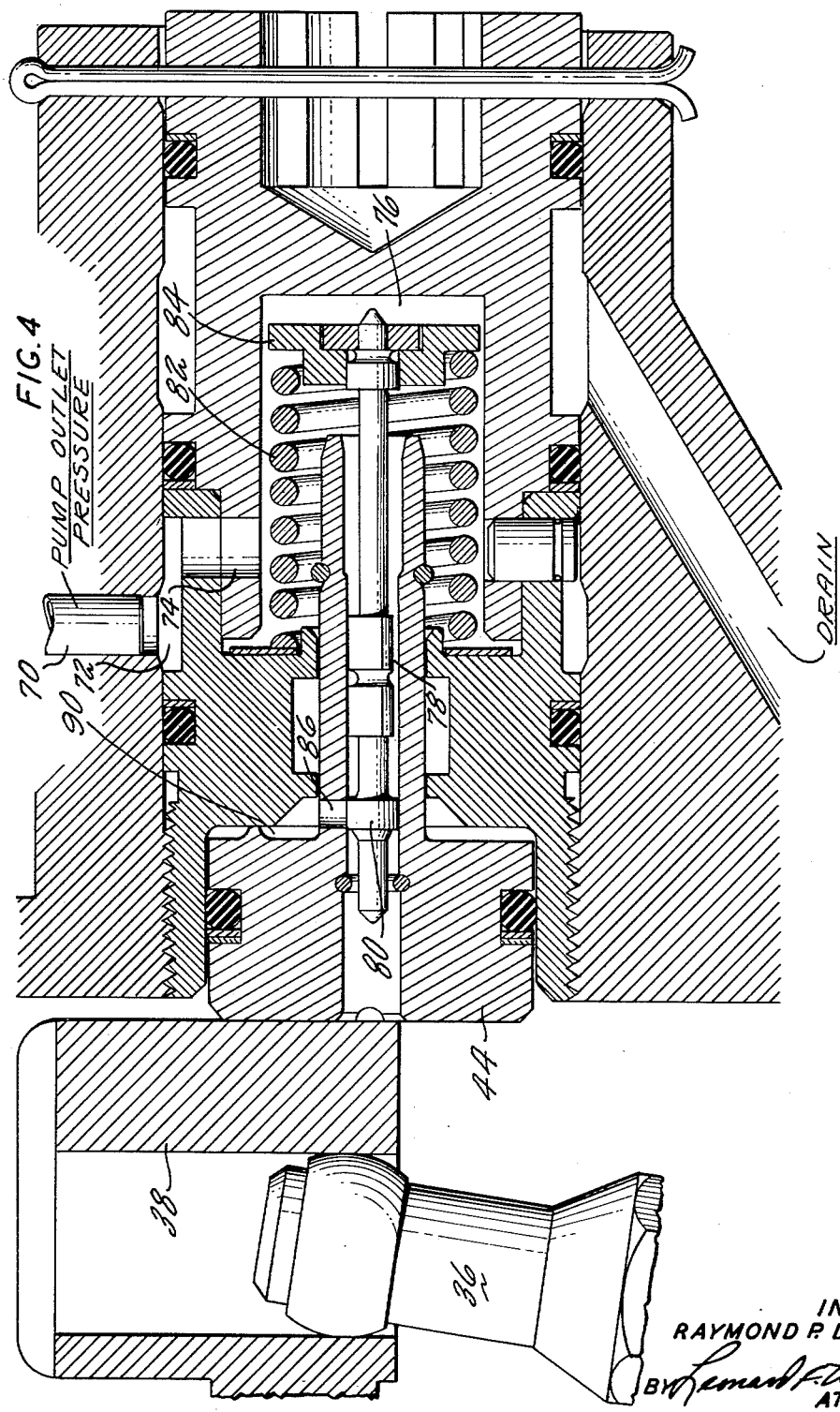

United States Patent Office 3,051,092
Patented Aug. 28, 1962

3,051,092
PUMP TORQUE LIMITING MEANS
Raymond P. Lambeck, Simsbury, Conn., assignor to United Aircraft Corporation, East Hartford, Conn., a corporation of Delaware
Filed Jan. 6, 1959, Ser. No. 785,238
3 Claims. (Cl. 103—161)

This invention relates to hydraulic pumps and more particularly to rotary piston variable displacement pumps.

In certain instances it is desirable to limit the torque input required by a variable displacement pump to protect or limit the power source which drives the pump.

It is therefore an object of this invention to provide a torque limiting control as an appendage to the usual stroke control in a variable displacement hydraulic pump.

It is a further object of this invention to provide a torque control means for a decreasing pump stroke in a direct relationship with pressure rise over a given range and then to further control the stroke to maintain a predetermined maximum output pressure for the pump.

These and other objects of this invention will become readily apparent from the following detailed description of the drawings in which:

FIG. 1 is a graph illustrating the operation of the torque control and the main pressure control;

FIG. 2 is a graph illustrating the effect of the torque control on the output flow of the pump;

FIG. 3 is a cross section through a typical rotary piston hydraulic pump illustrating in detail the pressure stroke control device; and FIG. 4 is a detailed enlarged cross section illustrating the torque control.

As seen in FIG. 1 a graph illustrates the relationship of torque and output pressure of the pump. The line 10 illustrates the normal relationship of torque increase with increased pump outlet pressure. Without a torque control the torque would continue to rise as shown by the dotted line 12. However, with a torque control incorporated, the torque levels off at some predetermined level and follows a line indicated by the numeral 14. If the torque control will maintain this predetermined torque, for example, between 2500 p.s.i. and 3000 p.s.i., at about 3000 p.s.i. the normal pressure regulating stroke control takes over and maintains this pressure and continues to decrease torque at this outlet pressure until almost zero torque is obtained. Theoretically, zero torque is not obtainable.

Referring to FIG. 1 wherein torque is plotted versus pressure, we can see that as the pressure increases, the torque increases on an approximate 45° line. Under normal conditions, this torque curve continually increases in a straight line being limited in its magnitude by the maximum limiting pressure. This invention, however, limits the torque prior to reaching the maximum limiting pressure. Hence, torque increases to point A and is then maintained constant to point B and finally is reduced by the normal stroke control to zero at point C.

In other words, the stroke varies inversely with pressure in such a way as to maintain a constant torque until maximum limiting pressure is reached, then pressure is held constant as torque reduces to zero. This simply means that as pressure increases, the flow is decreased (stroke is decreased). This is shown in FIG. 2 where flow is plotted versus pressure. As is evident, the flow remains constant until point A' is reached wherein it decreases to point B'. This is simply another way of showing that as pressure increases, the flow decreases to maintain a constant torque until the maximum limiting pressure is reached. From point B' to point C' the normal stroke control takes over control.

Referring to FIG. 3, a typical rotary piston hydraulic pump is shown generally at 20. The pump includes an outer casing 22 and rotor 24 which is rotated about a pintle 25 having an axis 26. A rotor carries a plurality of reciprocating pistons 28 whose outer ends 30 engage a track ring 32. The track ring 32 engages the outer ends and, due to the eccentricity with respect to the axis 26, causes the pistons to reciprocate within their respective cylinders. A typical pump of this sort is shown in U.S. Patent No. 2,653,542, issued September 29, 1953, to R. F. Horton.

The track ring 32 may be pivoted about a knife edge 34 and moved by a depending arm 36. The depending arm 36 is engaged by a stroke control head 38. The stroke control head is moved to the left and right by a pressure regulating stroke controller generally indicated at 40. The torque limiting device generally indicated at 42 has an abutment 44 which engages the right side of the stroke control head 38. The torque control and the pressure control both can affect movement of the head 38 and the depending arm 36 to vary the stroke of the pump. The torque control can move the stroke control head only toward a stroke decrease position while the pressure control 40 can move the stroke control head 38 in either increase or decrease direction. The pressure control 40 receives pump outlet pressure via a passage 43 which leads to a drilled passage 45 and to a chamber 46 on the right-hand end of control valve 48. The control valve 48 includes a plurality of guides 50 and a flow controlling land 52. When the pressure in the chamber 46 builds up to a predetermined value such as 3000 p.s.i., the pressure acting on the right-hand side of the valve 48 moves it to the left against the force of spring 54 thereby moving the land 52 to the left to connect the high pressure chamber 46 with the passage 56 which leads to a chamber 58 on the right-hand side of servo piston 60. The high pressure near chamber 58 moves the servo piston 60 toward the left carrying with it the stroke control head 38 to reduce the stroke of the pistons 28. The pressure regulating stroke control 40 is intended to let the pump reach a maximum pressure, for example, 3000 p.s.i., and then to reduce the stroke sufficiently to maintain this pressure. Before the pump reaches the desired 3000 p.s.i. pressure, it may be desirable to begin reducing the pump stroke to avoid the generation of excess torque. It may be necessary, as for example, in aircraft where the amount of power necessary to drive the pump must be limited. For this reason the torque control 42 is provided to begin moving the stroke control head 38 to the left to a stroke decrease position to maintain the torque at a predetermined level. The action of this control is clearly shown in the graph in FIG. 1.

The torque control is more clearly shown in enlarged fashion in FIG. 4. As shown herein pump outlet pressure is fed via the pipe 70 into an annular chamber 72 and passage 74. This fluid enters the cavity 76 and passes along the clearance 78 so that it can act on the right-hand side of the valve land 80. The valve is urged to the right by means of a preselected spring 82 which abuts a disc 84 connected to the right-hand end of the valve stem. The spring 82 is selected so that it will respond in a predetermined fashion to the pump outlet pressure to provide a torque responsive device. When the torque of the pump begins to exceed a predetermined amount, the pump outlet pressure will reach a predetermined value sufficient to move the valve land 80 to the left thereby permitting high pressure fluid to pass through the passage 86 and then into the chamber 90 on the right-hand side of the servo piston 44. The servo piston 44 abuts the stroke control head 38 and is therefore capable of moving the head 38 to the left to a decrease stroke position.

Thus, as seen in FIG. 1 the outlet pressure and the torque begin to increase in a linear fashion and this torque would continue to increase to an excessive value if the torque control were not provided. As seen in FIG. 1 the torque would follow the lines 10 and 12 and reach the excessive value before the 3000-pound limit controlled by the pressure control 40 is reached. Thus, instead, as seen in FIG. 1, the torque rises to some predetermined value and then follows the line 14 at some fixed value until the pressure control takes over and reduces torque while maintaining pressure at the 3000 p.s.i. value.

It will be apparent that as a result of this invention a very simple torque limiting means has been provided with the normal pressure regulating stroke control. This type of torque limiting device permits the pumps to be manufactured at a minimum weight and prevents excessive power to be drawn from the pump driving unit.

Although only one embodiment of this invention has been illustrated and described herein, it will be apparent that various changes may be made in the construction and arrangement of the various parts without departing from the scope of the novel concept.

What is desired by Letters Patent is:

1. A variable displacement rotary piston hydraulic pump having a plurality of reciprocating pumping elements, means connected to said elements for varying the stroke of said reciprocating elements to vary the pump outlet including an eccentric ring engaging said elements, means responsive to the outlet pressure of the pump over a predetermined range for controlling said stroke varying means to reduce at a predetermined rate the stroke of said elements including a movable stop engaging said ring for moving it in a stroke reducing direction only, and means connected to said ring and responsive to an outlet pressure value of said pump for further controlling said stroke varying means including a device engaging said ring for limiting the pump discharge pressure.

2. In a rotary piston hydraulic pump having a plurality of reciprocating pistons, a rotor carrying said pistons and rotatable about an axis, a track ring engaging the outer ends of said pistons, said track ring movable in a concentric and eccentric position relative to said axis, means engaging said ring for varying the eccentricity of said ring relative to said axis for varying the stroke of said pistons, servo means operatively connected to said stroke varying means and responsive to the output pressure of said pump for reducing pump stroke over a given pressure range including a spring pressed pilot valve moved in response to said pump output pressure, and a second servo operated means connected to said ring and responsive to the outlet pressure of said pump for further reducing stroke at predetermined pressures above said range including a second pilot valve moved in response to said predetermined pressure.

3. In a rotary piston hydraulic pump having a plurality of reciprocating pistons, a rotor carrying said pistons and rotatable about an axis, a track ring engaging the outer ends of said pistons, a pivot supporting said track ring, said track ring movable in a concentric and eccentric position relative to said axis, means engaging said ring for varying the eccentricity of said ring relative to said axis for varying the stroke of said pistons including a stroke control element, servo means connected to said eccentricity varying means and responsive to the output pressure of said pump for reducing pump stroke at a predetermined rate over a given pressure range and moving said element in a stroke reducing direction only, and a second servo operated means operatively connected to said ring and responsive to the outlet pressure of said pump for further varying stroke of said pistons at pressures above said range for limiting the pump discharge pressure.

References Cited in the file of this patent

UNITED STATES PATENTS

| | | |
|---|---|---|
| 2,129,886 | Syrovy | Sept. 13, 1938 |
| 2,716,946 | Hardy | Sept. 6, 1955 |
| 2,799,138 | Dornhofer | July 16, 1957 |
| 2,799,995 | Herman | July 23, 1957 |
| 2,823,614 | Lapsley | Feb. 18, 1958 |